United States Patent [19]

Russo

[11] Patent Number: 4,964,999
[45] Date of Patent: Oct. 23, 1990

[54] PROCESS FOR FORMING STABLE EMULSIONS OF WATER SOLUBLE POLYSACCHARIDES IN HYDROCARBON LIQUIDS

[75] Inventor: Donald P. Russo, Louisville, Ky.

[73] Assignee: Hi-Tek Polymers, Inc., Jeffersontown, Ky.

[21] Appl. No.: 268,251

[22] Filed: Nov. 7, 1988

Related U.S. Application Data

[63] Continuation-in-part of Ser. No. 61,822, Jun. 15, 1987, abandoned.

[51] Int. Cl.$^5$ .......................... E21B 43/00; C09K 3/00
[52] U.S. Cl. ................................. 252/8.551; 252/8.51; 252/8.554; 252/308; 252/363.5; 536/114
[58] Field of Search ................. 252/8.51, 8.551, 8.554, 252/308, 363.5; 536/114

[56] References Cited

U.S. PATENT DOCUMENTS

| | | | |
|---|---|---|---|
| Re. 28,474 | 7/1974 | Anderson et al. | 252/363.5 X |
| 3,244,638 | 4/1966 | Foley et al. | 252/308 |
| 4,233,162 | 11/1980 | Carney | 252/8.551 X |
| 4,312,675 | 1/1982 | Pickens et al. | 106/178 X |
| 4,427,556 | 1/1984 | House et al. | 252/8.51 |
| 4,571,422 | 2/1986 | Symes et al. | 536/114 |
| 4,659,486 | 4/1987 | Harmon | 252/8.551 X |
| 4,670,167 | 6/1987 | Bleeker et al. | 252/8.554 |
| 4,894,335 | 1/1990 | Peignier et al. | 252/8.511 X |

OTHER PUBLICATIONS

Kirk–Othmer, Encyclopedia of Chemical Technology, vol. 10, Second Edition, 1966, pp. 741 and 742.

Primary Examiner—Robert L. Stoll
Assistant Examiner—Chhaya Sayala
Attorney, Agent, or Firm—Herbert P. Price

[57] ABSTRACT

Stable emulsion are made from hydrocarbon liquids, water and a water-soluble polysaccharide, plus a fatty acid alkanol amide surfactant. These emulsions are readily dispersed in water to form viscous solutions useful in the clarification of waste waters, in paper making operations and in oil service operations.

14 Claims, No Drawings

PROCESS FOR FORMING STABLE EMULSIONS OF WATER SOLUBLE POLYSACCHARIDES IN HYDROCARBON LIQUIDS

CROSS REFERENCE TO RELATED APPLICATION

This is a continuation-in-part of copending application, Ser. No. 61,822, filed June 15, 1987, now abandoned.

BACKGROUND OF INVENTION

The field of art to which this invention pertains is stable emulsions of water soluble gums.

Various synthetic and natural water soluble polymers have been developed which exhibit superior thickening and flocculating properties in aqueous solutions. These polymers are being used increasingly in a number of commercial applications, such as in the clarification of aqueous systems, in paper making operations, in the treatment of sewage and industrial waste, in stabilizers for drilling muds and in the secondary recovery of petroleum by water flooding and by fracturing.

Although these polymers are available commercially as powders or as finely divided solids, they are most frequently utilized as aqueous solutions. This requires the solid polymeric material to be dissolved in water. This is a time consuming step as well as one which has serious drawbacks with respect to the actual dispersion of the solid material in the aqueous medium. Although the various polymers are more or less soluble in water, difficulty is often experienced in preparing aqueous polymer solutions because of the polymer's slow dissolution and because the solid polymer is not readily dispersible in water. Furthermore, dispersions of solid polymers in water are hindered by the tendency to clump or remain as agglomerates on contact with water. Lumps of solid polymer immediately form by the encapsulation of undissolved solids in an outer coating of water-wet polymer, which retards the penetration of additional water into the agglomerate. Although many of these lumps can be dissolved by continued agitation, it is usually not practical to agitate the solution for a time sufficient to obtain complete dissolution of the polymer.

Various means have been proposed to facilitate the dissolution of water soluble polymers in water. In U.S. Pat. No. 3,122,203, polyacrylamide is intimately mixed with a dispersing agent and a finely divided inert solid carrier and this mixture is then dispersed in an organic liquid. Although aqueous solutions of the polymer can be made by adding the dispersion to water with minimal agitation, the organic dispersions themselves are not stable in that the polymer rather quickly will settle to the bottom of the container with hard caking.

In U.S. Pat. No. 3,503,895, a water soluble gum is blended with a solution of a surfactant in an organic liquid. When thoroughly blended, the solvent is evaporated leaving a dry powder. This dry powder will dissolve more readily than the untreated gum. However, the large amount of surfactant required to render the gum readily soluble is detrimental in some applications.

French Patent No. 1,485,729 discloses dispersions of water soluble gums in water miscible solvents, such as glycerol and ethylene glycol. Such dispersions can be rapidly dissolved in water. However, the dispersions themselves are unstable in that the gums settle out and form hard cakes in the bottom of the container.

U.S. Pat. Nos. 28,474 and 28,576 describe inverse emulsions which are aqueous solutions of water soluble polymers dispersed in organic liquids to form water-in-oil emulsions. Such emulsions can be added to water to rapidly form aqueous solutions of the polymers.

Inverse emulsions can also be made by adding water with agitation to an oil-emulsifier mixture to form an emulsion. Finely divided polymer particles are then added to the emulsion with rapid agitation followed by passing the mixture through a homogenizer.

SUMMARY OF THE INVENTION

This invention is directed to emulsions of water soluble polysaccharides in hydrocarbon liquids. In one aspect this invention pertains to a process for preparing stable emulsions. In another aspect this invention relates to a process for preparing emulsions of water soluble polysaccharides which dissolve rapidly in water.

In carrying out the process of this invention, a surfactant is blended with a finely divided polysaccharide in the amount of about 0.5 to about 5 weight percent surfactant based on the weight of the polysaccharide. The blend is then dispersed in a hydrocarbon liquid followed by the addition of water to form a stable emulsion. The surfactant is a fatty acid alkanol amide having the formula:

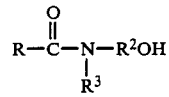

wherein R is an alkyl group having about 12 to about 30 carbon atoms, $R^2$ is an alkylene group having 2 to about 4 carbon atoms and $R^3$ is H or $R^2OH$. The polysaccharide is present in the amount of about 25 to about 40 weight percent, the water is present in the amount of about 15 to about 30 weight percent and the liquid hydrocarbon is present in the amount of about 30 to about 60 weight percent, said weight percents being based on the total weight of the emulsion.

DESCRIPTION OF THE INVENTION

The water soluble polysaccharides useful in this invention are the naturally occurring polysaccharides and their derivatives. As used herein, the term "polysaccharides" shall refer to both polysaccharides and polysaccharide derivatives. Representative polysaccharides are the natural gums, such as arabic, tragacanth, karaya and the polygalactomannans which include guar gum and locust bean gum. Additional polysaccharides are the water soluble derivatives of the natural gums, such as hydroxypropyl guar, hydroxyethyl guar, carboxymethyl guar, carboxymethyl hydroxpropyl guar, diethylamino guar, methyl guar and the like. Other useful polysaccharides include xanthan gum, modified starches, e.g., hydroxypropyl starch, and the water soluble derivatives of cellulose, such as methyl cellulose, hydroxyethyl cellulose, hydroxypropyl cellulose, hydroxyethyl propyl cellulose, hydroxyethyl methyl cellulose, carboxymethyl cellulose and the like. The polysaccharides useful in this invention will generally have a mesh size (U.S. Standard sieve) of at least less than about 50 and, preferably, less than about 100. The preferred polysaccharides are the polygalactomannan and their derivative with the most preferred being guar gum and its derivatives.

The hydrocarbons liquids in which the polysaccharides are dispersed in this invention are aliphatic, cycloaliphatic and aromatic hydrocarbons which are liquid at room temperature and which have boiling points above about 30° C. Useful hydrocarbon liquids contain at least 6 carbon atoms per molecule, such as hexane, heptane, decane, decene, dodecane, benzene, toluene, xylene, cyclohexane and the various petroleum distillates, such as gasoline, kerosene and diesel oil. A preferred hydrocarbon liquid is diesel oil.

The surfactants useful in this invention are the fatty acid alkanol amides which are derivatives of fatty acids and primary or secondary alkanol amines. The fatty acid alkanol amides are represented by the formula:

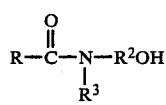

wherein R is an alkyl group which contains about 12 to about 30 carbon atoms, $R^2$ is an alkylene group containing 2 to about 4 carbon atoms and $R^3$ is H or $R^2OH$. Examples of such surfactants are the diethanolamide of oleic acid, the ethanolamide of oleic acid, the ethanolamide of palmitic acid, the propanolamide of stearic acid and the like.

The compositions of this invention are prepared by blending the polysaccharide and the surfactant together to form a dry powder. Flow control agents, such as finely divided silica, can be added to enhance the flowability of the powder. The dry powder is added to a hydrocarbon liquid with sufficient stirring to wet the powder and to form a dispersion. Water is then added with stirring to form a smooth flowable emulsion or slurry. The slurry is stable, exhibiting very little if any separation of liquid and solids. When added to water, the slurry quickly disperses and hydrates to produce a viscous fluid.

The composition of this invention contain about 0.5 to about 5 weight percent, based on the weight of polysaccharide, of surfactant and, preferably, about 1 to about 3 weight percent. The water is present in the amount of about 15 to about 30 weight percent, the liquid hydrocarbon in the amount of about 30 to about 60 weight percent, and the polysaccharide is present in the amount of about 25 to about 40 weight percent, said weight percents being based on the total weight of the emulsion.

The following examples describe the invention in more detail. Parts and percentages unless otherwise designated are parts and percentages by weight.

EXAMPLE 1

Hydroxypropyl guar powder, 100 parts, was mixed with 1.25 parts of a fatty acid alkanolamide (Ninol 201- Stepan Chemical Company) and a small amount of finely divided silica free flow agent to form a free flowing powder. The powder, 36 parts, was stirred into 46 parts of diesel oil with sufficient mixing to thoroughly wet the powder. 18 parts of water were then added with stirring to form a smooth, flowable slurry having a viscosity of about 4000 cps at 25° C. The slurry exhibited less than 5 percent separation after standing for 48 hours. When added to water, the slurry quickly dispersed and hydrated forming a viscous fluid.

EXAMPLE 2

Hydroxypropyl guar powder, 100 parts, was mixed with 1.25 parts of the diethanol amide of oleic acid (Clindrol 200-0 Clintwood Chemical Company) and a small amount of free flow agent to form a free flowing powder. The powder, 36 parts, was stirred into 45 parts of diesel oil followed by the addition of 18 parts of water to form a smooth, flowable slurry having a viscosity of about 4500 cps at 25° C. The slurry exhibited less than 5 percent liquid separation after standing for 48 hours. When added to water, the slurry quickly dispersed and hydrated to product a viscous fluid.

EXAMPLE 3

When 36 parts of hydroxypropyl guar and no surfactant were stirred into 45 parts of diesel oil followed by the addition of 18 parts of water, a thick pasty mass was formed from which the oil quickly separated.

EXAMPLE 4

When 40 parts of hydroxypropyl guar were stirred into 60 parts of diesel oil, a smooth, flowable slurry resulted. However, the slurry had low viscosity, about 50 cps, and was unstable as exhibited by more than 40 percent liquid separation after 2 hours.

EXAMPLE 5

When Example 2 was repeated using 1.25 parts of polyoxyethylene sorbitan monostearate (Tween 60 - Atlas Chemical Company) in place of the diethanol amide of oleic acid, a lumpy slurry resulted which had a viscosity of about 6500 cps at 25° C. The slurry was unstable, exhibiting more than 15 percent liquid separation after standing for 48 hours.

EXAMPLE 6

When Example 2 was repeated using 1.25 parts of sorbitan trioleate (Span 85 - Atlas Chemical Company) in place of the diethanol amide of oleic acid, a lumpy slurry resulted which had a viscosity of about 7800 cps. The slurry was unstable, exhibiting more than 20 percent liquid separation after standing for 48 hours.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit and scope of the invention.

What is claimed:

1. A process for forming a stable emulsion of a water soluble polysaccharide in a hydrocarbon liquid which comprises:
   (a) blending a finely divided water soluble polysaccharide with a surfactant which is a fatty acid alkanol amide having the formula:

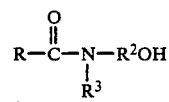

wherein R is an alkyl group having about 12 to about 30 carbon atoms, $R^2$ is an alkylene group having 2 to about 4 carbon atoms and $R^3$ is H or $R^2OH$ in the amount of about 0.5 to about 5 weight percent surfactant based on the weight of the polysaccharide to form a dry powder;

(b) dispersing (a) in a hydrocarbon liquid; and (c) adding water to the dispersion of (b) to form a stable emulsion wherein the polysaccharide is present in the amount of about 25 to about 40 weight percent, the water is present in the amount of about 15 to about 30 weight percent and the hydrocarbon liquid is present in the amount of about 30 to about 60 weight percent, said weight percents being based on the total weight of the emulsion.

2. The process of claim 1 wherein the particle size of the polysaccharide is less than 50 mesh (U.S. Standard Sieve).

3. The process of claim 2 wherein the particle size is less than 100 mesh (U.S. Standard Sieve).

4. The process of claim 1 wherein the hydrocarbon is a liquid at room temperature and has a boiling point above 30° C.

5. The process of claim 4 wherein the hydrocarbon is an aliphatic, cycloaliphatic or aromatic hydrocarbon having at least six carbon atoms per molecule.

6. The process of claim 4 wherein the hydrocarbon is a petroleum distillate.

7. The process of claim 6 wherein the petroleum distillate is diesel oil.

8. The process of claim 1 wherein the surfactant is the diethanolamide of oleic acid.

9. The process of claim 1 wherein the surfactant is the ethanolamide of palmitic acid.

10. The process of claim 1 wherein the surfactant is the propanolamide of stearic acid.

11. The process of claim 1 wherein the polysaccharide is a polygalactomannan.

12. The process of claim 11 wherein the polygalactomannan is guar gum.

13. The process of claim 12 wherein the polygalactomannan is hydroxypropyl guar gum.

14. A stable emulsion obtained by the process of claim 1.

* * * * *